US009185158B2

(12) United States Patent
Wang et al.

(10) Patent No.: US 9,185,158 B2
(45) Date of Patent: *Nov. 10, 2015

(54) CONTENT DELIVERY IN A NETWORK (75) Inventors: Jin-Gen Wang, Lafayette, CO (US);
Qing Li, Broomfield, CO (US); Ron Munoz, Arvada, CO (US)

(73) Assignee: Level 3 Communications, LLC, Broomfield, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 12/420,965

(22) Filed: Apr. 9, 2009

(65) Prior Publication Data
US 2009/0282159 A1    Nov. 12, 2009

Related U.S. Application Data (60) Provisional application No. 61/043,663, filed on Apr. 9, 2008.

(51) Int. Cl.
*G06F 15/16* (2006.01)
*H04L 29/08* (2006.01)
*H04L 29/12* (2006.01)
(Continued)

(52) U.S. Cl.
CPC ............ *H04L 67/06* (2013.01); *G06F 21/10* (2013.01); *H04L 61/609* (2013.01); *H04L 63/101* (2013.01); *H04L 67/18* (2013.01); *H04L 67/2814* (2013.01); *H04L 67/2842* (2013.01); *G06F 2221/2103* (2013.01); *G06F 2221/2107* (2013.01); *G06F 2221/2111* (2013.01); *G06F 2221/2115* (2013.01); *G06F 2221/2119* (2013.01); *G06F 2221/2141* (2013.01); *G06F 2221/2145* (2013.01); *H04L 67/2852* (2013.01); *H04L 67/322* (2013.01); *H04L 67/327* (2013.01)

(58) Field of Classification Search
None
See application file for complete search history.

(56) References Cited

U.S. PATENT DOCUMENTS

| 6,195,680 | B1 | 2/2001 | Goldszmidt et al. |
| 6,345,264 | B1 | 2/2002 | Breese et al. |
| 6,353,813 | B1 | 3/2002 | Breese et al. |

(Continued)

FOREIGN PATENT DOCUMENTS

| CA | 6727914 | 4/2004 |
| EP | 1786171 | 5/2007 |

(Continued)

OTHER PUBLICATIONS

Canada Examination Report, dated Jan. 16, 2013, Application No. 2720085, 4 pgs.

(Continued)

*Primary Examiner* — Abdullahi E Salad (57) ABSTRACT

An embodiment of a method includes receiving a request for the content from a requester, retrieving the content from a media access server, and while retrieving the content from the media access server, simultaneously streaming the content to the requester. An embodiment of a system includes an edge server having a media streaming server configured to receive the request and stream the specified content to a requester from a local memory, and a stream caching server configured to retrieve the requested content from a media access server while the media streaming server is streaming at least a specified portion of the content, and wherein the stream caching server is further configured to store the retrieved content in a local cache and notify the media streaming server that content is stored in local cache.

18 Claims, 8 Drawing Sheets (51) Int. Cl.
*H04L 29/06* (2006.01)
*G06F 21/10* (2013.01)

(56) References Cited

U.S. PATENT DOCUMENTS

| | | | |
|---|---|---|---|
| 7,289,493 B1 | 10/2007 | Vera | |
| 7,412,531 B1* | 8/2008 | Lango et al. | 709/231 |
| 7,484,002 B2* | 1/2009 | Swildens et al. | 709/241 |
| 7,564,840 B2 | 7/2009 | Elliott et al. | |
| 7,864,710 B2 | 1/2011 | Wang | |
| 7,995,506 B2 | 8/2011 | Kalish | |
| 8,036,214 B2 | 10/2011 | Elliot et al. | |
| 8,085,761 B2 | 12/2011 | Elliott et al. | |
| 8,089,858 B2 | 1/2012 | Stadelmeier et al. | |
| 8,270,421 B2 | 9/2012 | Elliott et al. | |
| 2002/0002543 A1 | 1/2002 | Spooren et al. | |
| 2002/0010798 A1 | 1/2002 | Ben-Shaul et al. | |
| 2002/0042817 A1* | 4/2002 | Lahr | 709/213 |
| 2002/0065899 A1* | 5/2002 | Smith et al. | 709/214 |
| 2002/0147827 A1* | 10/2002 | Breiter et al. | 709/231 |
| 2003/0088686 A1 | 5/2003 | Jennings | |
| 2004/0003101 A1 | 1/2004 | Roth et al. | |
| 2004/0225728 A1 | 11/2004 | Huggins et al. | |
| 2004/0226051 A1 | 11/2004 | Carney et al. | |
| 2005/0071496 A1* | 3/2005 | Singal et al. | 709/232 |
| 2005/0102371 A1 | 5/2005 | Aksu | |
| 2005/0105513 A1 | 5/2005 | Sullivan et al. | |
| 2006/0010252 A1 | 1/2006 | Miltonberger et al. | |
| 2006/0128397 A1 | 6/2006 | Choti et al. | |
| 2006/0271641 A1* | 11/2006 | Stavrakos et al. | 709/217 |
| 2006/0282542 A1* | 12/2006 | Pinckney et al. | 709/231 |
| 2007/0094405 A1 | 4/2007 | Zhang | |
| 2007/0130210 A1* | 6/2007 | Park | 707/104.1 |
| 2007/0162392 A1 | 7/2007 | McEnroe et al. | |
| 2008/0034268 A1 | 2/2008 | Dodd et al. | |
| 2008/0133767 A1 | 6/2008 | Birrer et al. | |
| 2008/0168516 A1* | 7/2008 | Flick et al. | 725/112 |
| 2008/0208378 A1 | 8/2008 | Booth et al. | |
| 2008/0256326 A1 | 10/2008 | Patterson et al. | |
| 2009/0109298 A1 | 4/2009 | Wan | |
| 2009/0259611 A1 | 10/2009 | Wang | |
| 2010/0325303 A1 | 12/2010 | Wang et al. | |

FOREIGN PATENT DOCUMENTS

| | | |
|---|---|---|
| EP | 1788787 A1 | 5/2007 |
| WO | WO-0177783 A2 | 10/2001 |
| WO | WO-02073391 A1 | 9/2002 |
| WO | WO-03023676 A1 | 3/2003 |

OTHER PUBLICATIONS

Canada Examination Report, dated Oct. 16, 2012, Application No. 2720087, 2 pgs.

Supplementary European Search Report, dated Mar. 5, 2014, Application No. 09729443.3, filed Apr. 9, 2009; 8 pgs.

European Extended Search Report and Written Opinion, dated Feb. 18, 2014, Application No. 09731111.2, filed Apr. 9, 2009, 6 pgs.

Canadian Examination Report, dated May 20, 2014, Application No. 2,720,085, filed Apr. 9, 2009; 4 pgs.

Canadian Examination Report, dated Aug. 12, 2015, Application No. 2,720,085, filed Apr. 9, 2009; 9 pgs.

\* cited by examiner

CONTENT DELIVERY IN A NETWORK

CROSS REFERENCE TO RELATED APPLICATIONS

This application claims the benefit of priority to U.S. Provisional Patent Application 61/043,663, filed Apr. 9, 2008, titled "Content Distribution and Delivery in a Network", which is incorporated herein by reference for all purposes.

COPYRIGHT NOTICE

Contained herein is material that is subject to copyright protection. The copyright owner has no objection to the facsimile reproduction of the patent disclosure by any person as it appears in the Patent and Trademark Office files or records, but otherwise reserves all rights to the copyright whatsoever. Copyright © 2009 Level 3 Communications, LLC.

TECHNICAL FIELD

Embodiments presently disclosed generally relate to content distribution and delivery in a network. More specifically, embodiments herein relate to streaming content to a requester while simultaneously receiving the content from a media access server.

BACKGROUND

Internet use has grown tremendously in recent years. The types and sources of content on the Internet have also grown. For example, computer users often access the Internet to download video, audio, multimedia, or other types of content for business, entertainment, education, or other purposes. Users typically want content "on-demand", and would prefer not to wait a long time for download before viewing the content. Certain types of content tend to take longer than others to download. For example, download of a movie can take many minutes or hours, depending on the type of download technology used and the size of the movie file.

Conventional data transport technologies, such as Hypertext Transport Protocol (HTTP) or File Transport Protocol (FTP), are designed to ensure high quality transmission, but not necessarily for quick viewing of content. Generally, a web server that employees HTTP delivers content using "progressive download". Using progressive download, all portions of a file generally must be downloaded to the user's computer (e.g., the client) up to a given point in the content before the user can begin watching the content from that point. As a result, if the user is only interested in a particular portion of the content somewhere in the middle of a file, the user must wait until all of the content up to that point of interest is received by the user's computer. For example, if the user wants to skip to a particular point in the content (e.g., using the scroll bar in the user's viewer), the user must generally wait until all portions of the content up to the selected point have been downloaded.

Streaming is an alternative to progressive download. Streaming content offers advantages over progressive download, from the user's perspective. When content is streamed from the server, virtually any portion of the content can be viewed almost immediately by the user. For example, if the user wants to skip to a particular point in the content, a streaming server can immediately begin sending content from the point requested by the user, rather than first delivering all content up to the requested point. In order to provide streaming, a web server must have a streaming media server, such as Microsoft's Windows Media Services™, RealNetworks' Helix Server™, or Adobe's Flash Media Server™.

However, much of the content on the Internet is still delivered with progressive download over HTTP because the existing infrastructure supports these technologies. Network providers often do not want to upgrade server computers to include streaming media servers because of cost and potential disruption of network operation. Network providers often decide that progressive download is the simpler and less costly option because it makes use of existing infrastructure. As a result, users who have client systems that are capable of playing streaming content often cannot take full advantage of their client's streaming capability because web servers often do not have the streaming capability.

In addition, generally content originates at a server (an originating server) and is copied onto one or more other servers (non-originating servers) throughout a network or networks, which disseminate the content to computer users. When a user requests to view content, a non-originating server may be selected to handle the download based on some selection criteria. Thus, many servers throughout a network or networks may have copies of the same content. Given the amount of content potentially available on a content delivery network, in order to host copies of content throughout a network takes a tremendous amount of storage capacity. It is often impractical for copies of content to be hosted by non-originating servers.

SUMMARY

Embodiments presently disclosed generally relate to content distribution and delivery in a network. More specifically, embodiments herein relate to streaming content to a requester while simultaneously receiving the content from a media access server.

An embodiment of a method includes receiving a request for the content from a requester, retrieving the content from a media access server, and while retrieving the content from the media access server, simultaneously streaming the content to the requester. The media access server may include a server selected from a group including an origin server and a content distribution server. Retrieving the content may include requesting the content from a server that employees progressive download. Retrieving the content may include retrieving the content using a data transport protocol.

In an embodiment of the method simultaneously streaming the content includes maintaining a streaming state used by a streaming media server. Prior to retrieving the content from the media access server, it may be determined whether the requested content is stored in local memory or local disk and is not stale. Retrieving the content may include first requesting initial data used by a streaming media server to begin streaming the content. Retrieving the content may include generating at least one range request specifying a range of data to be retrieved, wherein the range of data is selected based on a measurement of response speed from the media access server.

Retrieving the content may further include requesting an additional portion of the content, and repeating the requesting of an additional portion of content until all the content is retrieved. Requesting an additional portion of the content and repeating the requesting may include requesting sequential portions of the content. Further still, the method may include receiving a location-specific request specifying a particular location within the content. The method may further include interrupting the repeating of requesting sequential portions of the content, and retrieving data from the media access server at the location specified in the location-specific request if the data at the location has not yet been retrieved.

An embodiment of a system for delivering content includes an edge server configured to handle a request for specified content. The edge server includes a media streaming server configured to receive the request and stream the specified content to a requester from a local memory, and a stream caching server configured to retrieve the requested content from a media access server while the media streaming server is streaming at least a specified portion of the content, and wherein the stream caching server is further configured to store the retrieved content in a local cache and notify the media streaming server that content is stored in local cache.

The stream caching server may be further configured to first retrieve metadata associated with the content, wherein the metadata is used by the media streaming server to begin streaming the content when not all content is stored in the local cache. The stream caching server may be further configured to determine whether content stored in cache is stale, and if the content is determined to be stale, send a request to the media access server to revalidate the stale content.

The stream caching server may be further configured to sequentially retrieve ranges of data in the requested content. Still further, the stream caching server may be configured to interrupt sequential retrieval of data to retrieve data at a particular location specified in a location-specific request. The system may further include a media streaming broker configured to maintain states of the media streaming server. The stream caching server may be configured to retrieve the content over a data transport channel from a data transport server of the media access server.

An embodiment of a computer program product includes one or more computer-readable media storing computer-executable instructions, which cause a computer to carry out a process for delivering content. An embodiment of the process includes receiving a request from a requester for content, the request identifying the content, determining whether the identified content is stored in a local cache, if the identified content is stored in the local cache, determining whether the locally stored content is stale, if the identified content is stored in the local cache and is not stale, notifying a media streaming server that the content is ready for streaming, if the identified content is stored in the local cache, and is stale, requesting revalidation from a media access server, if the identified content is not stored in cache, retrieving the identified content from the media access server, and simultaneous to retrieving the content from the media access server, streaming the content to the requester.

In an embodiment of the computer program product, retrieving the content may further include first requesting at least a first portion of the content, the first portion of the content including parameters related to the content, notifying the media streaming server that the first portion is ready for streaming from the local cache, sequentially requesting remaining portions of the content; and if a location-specific request is received, interrupting sequential requesting of remaining portions of the content to retrieve data at a particular location specified in the location-specific request.

DETAILED DESCRIPTION

Embodiments presently disclosed generally relate to content distribution and delivery in a network. More specifically, embodiments herein relate to streaming content to a requester while simultaneously receiving the content from a media access server.

Figure 1:
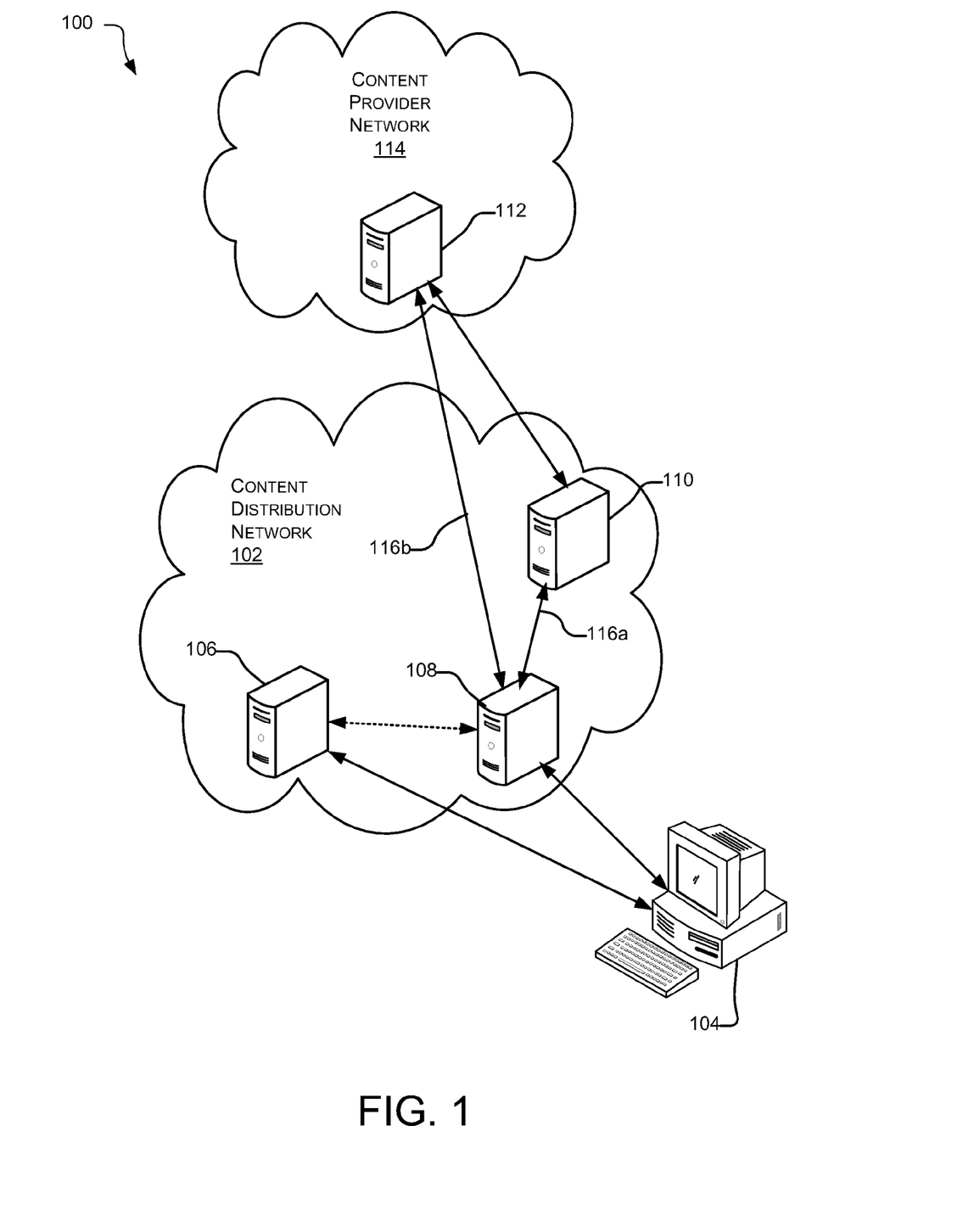
FIG. 1 illustrates an example network environment suitable for distributing content according to various embodiments.

FIG. 1 illustrates an example network environment 100 suitable for distributing content according to various embodiments. A computer user (not shown) may access a content distribution network (CDN) 102 using a computing device, such as a desktop computer 104. The CDN 102 is illustrated as a single network for ease of illustration, but in actual operation, CDN 102 may typically include one or more networks.

For example, network 102 may represent one or more of a service provider network, a wholesale provider network and an intermediate network. The user computer 102 is illustrated as a desktop computer, but the user may use any of numerous different types of computing devices to access the network 102, including, but not limited to, a laptop computer, a handheld computer, a personal digital assistant (PDA), or a cell phone.

The network 102 may be capable of providing content to the computer 104. Content may be any of numerous types of content, including video, audio, images, text, multimedia, or any other type of media. The computer 104 includes an application to receive, process and present content that is downloaded to the computer 104. For example, the computer 104 may include an Internet browser application, such as Internet Explorer™ or Firefox™, and a streaming media player, such as Flash Media Player™ or Quicktime™. When the user of computer 104 selects a link (e.g., a hyperlink) to a particular content item, the user's web browser application causes a request to be sent to a directory server 106, requesting that the directory server provide a network address (e.g., and Internet protocol (IP) address) where the content associated with the link can be obtained.

In some embodiments, directory server 106 is a domain name system (DNS), which resolves an alphanumeric domain name to an IP address. Directory server 106 resolves the link name (e.g., a universal resource locator (URL)) to an associated network address and then notifies the computer 104 of the network address from which the computer 104 can retrieve the selected content item. When the computer 104 receives the network address, the computer 104 then sends a request for the selected content item to a computer, such as streaming server computer 108, associated with the network address supplied by the directory server 106.

In the particular embodiment illustrated, streaming server computer 108 is an edge server of the CDN 102. Edge server computer 108 may be more or less strategically placed within the network 102 to achieve one or more performance objectives such as reducing load on interconnecting networks, freeing up capacity, scalability and lowering delivery costs.

The edge server 108, for example, may cache content that originates from another server, so that the cached content is available in a more geographically or logically proximate location to the end user. Such strategic placement of the edge server 108 could reduce content download time to the user computer 104.

Edge server computer 108 is configured to provide requested content to a requester. As used herein, the term "requester" can include any type of entity that could potentially request content, whether the requester is the end user computer or some intermediate device. As such, a requester could be the user computer 104, but could also be another computer, or a router, gateway or switch (not shown) requesting the content from the edge server computer 108. As will be understood, requests generated by the computer 104 are typically routed over numerous "hops" between routers or other devices to the edge server computer 108. Accordingly, a requester of content could be any of numerous devices communicably coupled to the edge server computer 108.

As part of the function of providing requested content, the edge server computer 108 in configured to determine whether the requested content is available locally from the edge server computer 108 to be provided to the requester. In one embodiment, the requested content is available if the content is stored locally in cache and is not stale. As discussed further below, stale is a condition in which the content is older than a prescribed amount of time, typically designated by a "time-to-live" value. The edge computer server 108 is configured with media streaming server software, such as Flash Media Server™ (FMS) or Windows Media Server™ (WMS). As such, if the requested content is found to be locally stored on the edge computer server 108 and the cached content is not stale, the media streaming software can stream the requested content to the requester, in this case, the computer 104

If the edge server computer 108 determines that requested content is not available (e.g., is either not locally stored or is stale), the edge server computer 108 takes a remedial action to accommodate the request. If the content is locally stored but is stale, the remedial action involves attempting to revalidate the content. If the content is not locally stored or revalidation fails (in the case of stale content), the edge server computer 108 attempts to retrieve the requested content from another source, such as a media access server. A media access server (MAS) is a server computer that may be able to provide the requested content.

In the illustrated embodiment, two possible media access servers are shown: a content distribution server computer 110 and a content origin server 112. Content origin server 112 is a server computer of a content provider. The content provider may be a customer of a content distribution service provider that operates the network 102. The origin server 112 may reside in a content provider network 114.

In some embodiments, the content origin server 112 is an HTTP server that supports virtual hosting. In this manner, the content server can be configured to host multiple domains for various media and content resources. During an example operation, an HTTP HOST header can be sent to the origin server 112 as part of an HTTP GET request. The HOST header can specify a particular domain hosted by the origin server 112, wherein the particular domain corresponds with a host of the requested content.

The content distribution server 110 is typically a server computer within the content distribution network 102. The content distribution server 110 may reside logically in between the content origin server 112, in the sense that content may be delivered to the content distribution server 110 and then to the edge server computer 108. The content distribution server 110 may also employ content caching.

In some embodiments, the edge server computer 108 locates the media access server by requesting a network address from the directory server 106, or another device operable to determine a network address of a media access server that is capable of providing the content. The edge server computer 108 then sends a request for content to the located media access server. Regardless of which media access server is contacted, the media access server can respond to a request for specified content in several possible ways. The manner of response can depend on the type of request as well as the content associated with the request.

For example, the media access server could provide information to the edge computer server 108 that indicates that the locally cached version of the content on the edge computer server 108 is not stale. Alternatively, the media access server could send the specified content to the edge computer server 108, if the media access server has a non-stale copy of the specified content. In one embodiment, the media access server includes data transport server software, such as a Hypertext Transport Protocol (HTTP) server, or web server. In this case, the edge server computer 108 interacts with the media access server using the data transport protocol employed by the media access server.

With further regard to the communications between the edge server computer 108 and the media access server computer (e.g., either the content origin server 112 or the content distribution server 110), the two servers may communicate over a channel. These channels are illustrated as channel 116a between the edge server computer 108 and the content distribution server 110 and channel 116b between the edge server computer 108 and the content origin server 112. According to various embodiments described herein, channels 116 are data transport, meaning the channels 116 carry data using a data transport protocol, such as HTTP.

The edge server 108 is configured to retrieve content using a data transport protocol while simultaneously streaming content to the content requester. For example, the edge server computer 108 is operable to simultaneously stream requested content to the requester (e.g., the computer 104) while receiving the content from the origin server computer 112 over the data transport protocol channel 116b. Operations carried out by the edge server computer 108 and modules employed by the edge server computer 108 to perform simultaneous streaming and content retrieval are discussed in detail below.

Figure 2:
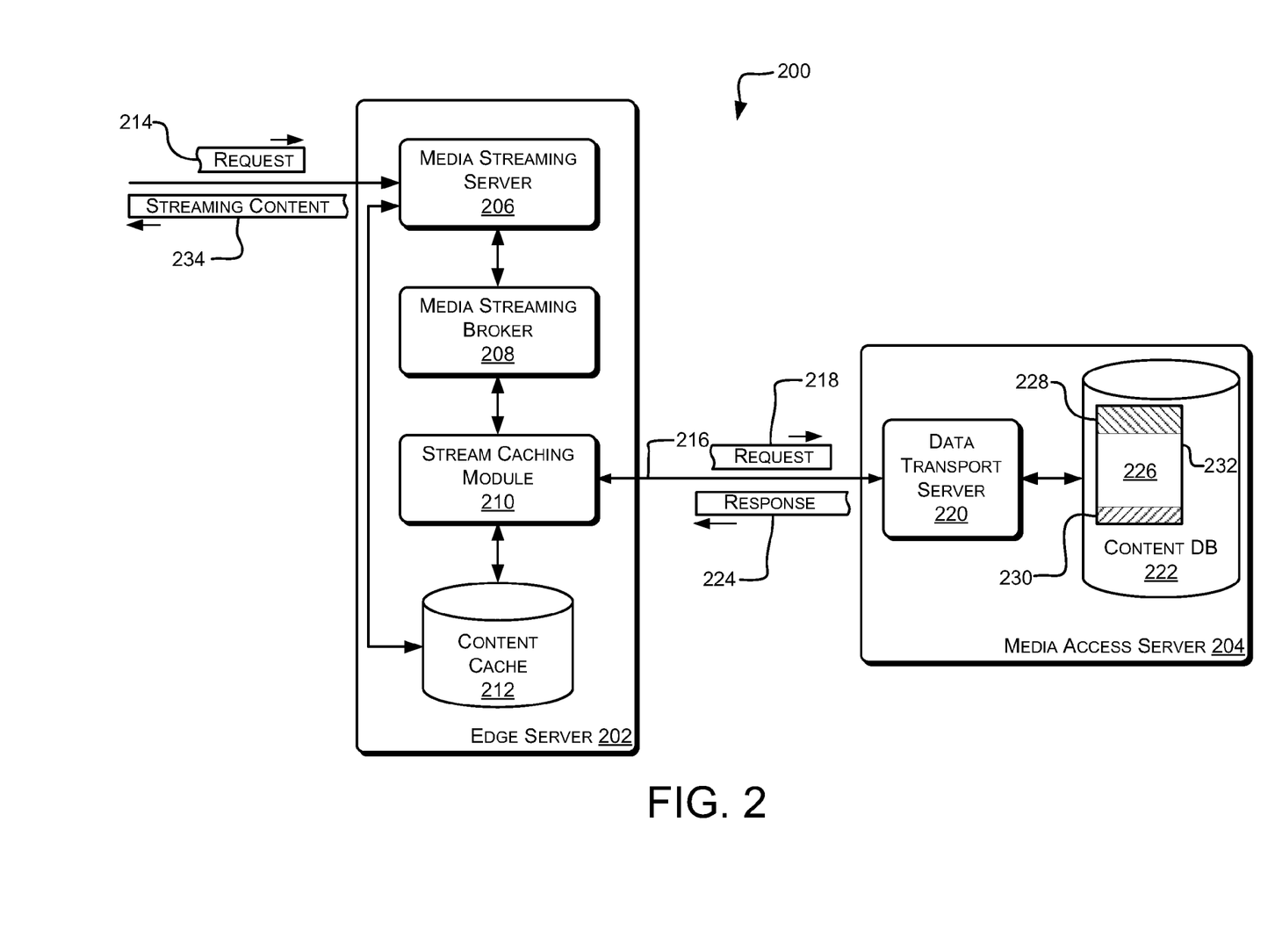
FIG. 2 illustrates a system in terms of functional modules for distributing content according to various embodiments.

FIG. 2 illustrates a streaming content delivery framework 200 including an edge server computer 202 and a media access server computer 204. Edge server computer 202 is configured with modules operable to retrieve content from the MAS 204, if necessary, while streaming the content to an entity that has requested the content. In some embodiments, retrieval of requested content from the MAS 204 is simultaneous with streaming of the content to the requester.

In the embodiment illustrated in FIG. 2, the edge server computer 202 includes a media streaming server 206, a media streaming broker 208, a stream caching module 210 and a content cache 212. In an illustrative scenario, a content request 214 is received from a requester. The content request has various information, including, but not limited to, an identifier of the content being requested. The request 214 may identify a particular portion of the content being requested.

The request 214 is initially received by the media streaming server. The media streaming server 206 could be a Flash Media Server™ (FMS), Windows Media Server™ (WMS), or other streaming media service. The media streaming server 206 is configured to communicate data with a content requester using a data streaming protocol (e.g., Real Time Messaging Protocol (RTMP)) in response to content requests. Upon receipt of request 214, the media streaming server 206 passes the request 214 to the media streaming broker 208 and waits for a response from the broker 208. As such, the media streaming broker 208 maintains the state of the media streaming server 206.

The media streaming broker 208 is operable to serve as a go-between for the media streaming server 206 and the stream caching module 210. As such, the media streaming broker 208 facilitates communications between the media streaming server 206 and the stream caching module 210 to thereby support streaming of content. In one embodiment, the media streaming broker 208 is a software plug-in that uses application programming interfaces (APIs) of the media streaming server 206 to communicate with the media streaming server 206. The media streaming broker 208 is operable to handle requests from the media streaming server 206, maintain some state of the media streaming server 206, and notify the media streaming server when content is in the cache 212. When the media streaming broker 208 receives a content request, the broker 208 generates a content request to the stream caching module 210.

The stream caching module (SCM) 210 includes functionality for responding to content requests from the broker 208. In one embodiment, shown in FIG. 3, which is discussed in conjunction with FIG. 2, the SCM 210 includes a streaming request handler 302, a cache manager 304 and a data transport interface 306. The streaming request handler 302 receives the request from the broker 208 and queries the cache manager 304 whether the requested content is in the cache 212. The cache manager 304 determines if the requested content exists in the cache 212.

Figure 3:
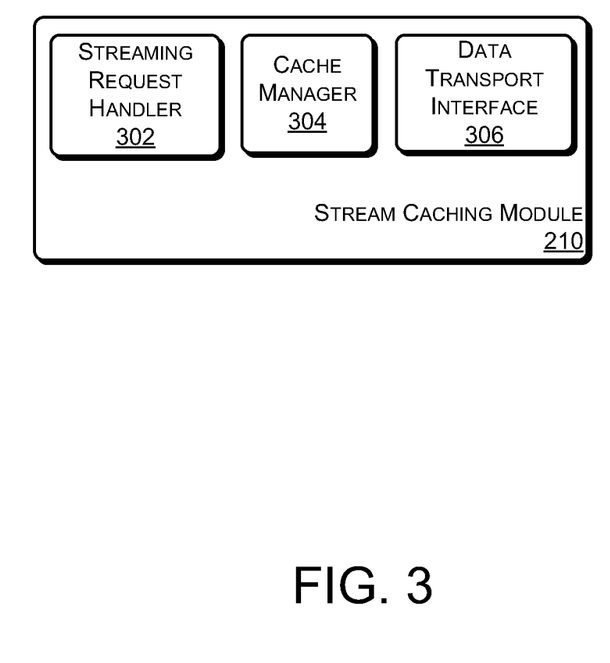
FIG. 3 is a functional module diagram illustrating one possible implementation of a streaming cache module according to various embodiments.

If the requested content is in the cache 212, the cache manager 304 of the SCM 210 checks the age of the content to determine if the content is stale. Generally, each content item has an associated time-to-live (TTL) value. The cache manager 304 notifies the request handler 302 of the results of the checks on the requested content; i.e., whether the content exists, and if so, whether the content is stale.

If the content exists in the cache 212 and is not stale, the request handler 302 notifies the media streaming server 206 via the media streaming broker that the content is ready to be streamed and provides a location in the cache 212 from which the content can be read. If the content is not in the cache 212, or the content is stale, the request handler 302 notifies the data transport interface 306. The data transport interface 306 is configured to communicate over a data transport channel, such as an HTTP channel 216, to the MAS 204.

The data transport interface 306 transmits a request 218 to the MAS 204 identifying the requested content. The request 218 may be one of several different types of requests, depending on the situation. For example, if it was determined that the requested content was in the cache 212, but the content was stale, the data transport interface 306 transmits a HEAD request (in the case of HTTP) to the MAS 204 indicating that the current state of the requested content in the local cache is stale. If the requested content is not in the cache 212, the data transport interface 306 transmits a GET (in the case of HTTP) request to the MAS 204 to retrieve at least a portion of the content from the MAS 204. The MAS 204 includes a data transport server 220, which receives and processes the request 218.

The data transport server 220 is configured to communicate via a data transport protocol, such as HTTP, over the data transport channel 216. Initially, the data transport server 220 determines if the content identified in the request 218 is in a content database 222 accessible to the MAS 204. The data transport server 220 queries the content database 222 for the requested content. Based on the response of the content database 222, the data transport server 220 generates a response 224, the contents of which depend on whether the requested content is in the database 222.

The response 224 generally includes a validity indicator, which indicates that the request 218 was or was not successfully received, understood and accepted. If the data transport protocol is HTTP, the response 224 indicator is a numerical code. If the requested content is not in the database 222, the code indicates invalidity, such as an HTTP 404 code, indicating the content was not found in the database 222.

If the requested content, for example file 226, is found in the database 222, the response 224 code will be a valid indicator, such as HTTP 2XX, where "X" can take on different values according to the HTTP definition. If the request 218 to the MAS 204 is a HEAD request, and the content is found in the database 222, the response 224 typically includes an HTTP 200 code. The response 224 to a HEAD request also includes information indicating whether the TTL of the content in cache 212 is revalidated or not. In the case of a GET request, and the requested content, e.g., file 226, is found in the database 222, the response 224 includes an HTTP code, along with a portion of the content 226.

The data transport interface 306 of the stream cache module 210 receives the response 224 and determines the appropriate action to take. In general, the data transport interface 306 notifies the streaming request handler 302 as to whether the content was found by the MAS 204 or not. If the content was not found by the MAS 204, and, assuming the cache manager 304 did not find the content in cache 212, the streaming request handler 302 notifies the media streaming server 206 via the media streaming broker 208 that the requested content is not found.

If the response 224 is a valid response to a HEAD request, the response 224 will indicate whether the TTL of stale content in cache 212 has been revalidated. If the TTL is revalidated, the cache manager 304 updates the TTL of the validated content and notifies the streaming request handler 302 that the content is available in cache 212 and is not stale. If the response 224 indicates that the stale content in cache 212 is not revalidated, the cache manager 304 deletes the stale content and indicates that the content is not in cache 212. The streaming request handler 302 then requests the content from the data transport interface 306.

A GET request can specify a portion of the content to be retrieved and if the GET request is valid, the response 224 will generally include the specified portion of the identified content. The request 218 can be a partial file request, or a range request, which specifies a range of data in the file 226 to be sent by the data transport server 220. The range may be specified by a beginning location and an amount; e.g., a byte count. Range requests are particularly useful for certain types of content and in response to certain requests, or other situations.

For example, if the requested file 226 is a Flash™ file, the first one or more GET requests will specify the portion(s) of the file 226 that are needed for the media streaming server 206 to immediately start streaming the file 226 to the requester. The entire file 226 is not required in order for the media streaming server 206 to start streaming the file 226 to the requester. In some cases, a particular portion of the content includes metadata about the content that enables the media streaming server 206 needs to start the streaming. Metadata may include file size, file format, frame count, frame size, file type or other information.

It has been found that for a Flash™ file, such as file 226, only a head portion 228 of the file 226 and a tail portion 230 of the file 226 are initially needed to start streaming the file 226 because the head 228 and the tail 230 include metadata describing the file 226. The remainder 232 of the file 226 can be obtained later. In one embodiment, the head portion 228 is the first 2 megabytes (MB) and the tail portion 230 is last 1 MB of the file 226, although these particular byte ranges may vary depending on various factors.

In the case of Flash™ file 226, after the head portion 228 and tail portion 230 of file 226 have been received by the data transport interface 306, the data transport interface 306 stores those portions in the cache 212, and the streaming request handler 302 is notified that the initial portions of the requested content are available in cache 212. The request handler 302 then notifies the streaming media server 206 of the location of the initial portions of the content in the cache 212. The streaming media server 206 then begins reading content from the cache 212 and sending streaming content 234 to the requester.

While the media streaming server 206 is streaming content to the requester, the SCM 210 continues to retrieve content of the file 226 from the MAS 204 until the remainder 232 is retrieved. The data transport interface 306 of the SCM 210 sends one or more additional GET requests to the data transport server 220 of the MAS 204, specifying range(s) of content to retrieve. In some embodiments, the data transport interface 306 requests sequential portions of the file 226 in set byte sizes, such as 2 MB or 5 MB at a time until the entire file 226 has been retrieved. The amount requested with each request can be adjusted depending on various parameters, including real time parameters, such as the latency of communications to and from the MAS 204.

During streaming of the requested content, the requester may issue a location-specific request requesting that data be streamed from a particular specified location within the content. The specified location may or may not yet be stored in the content cache 212. Such a location-specific request is received by the streaming media server 206 and passed to the media streaming broker 208. The streaming media broker 208 sends a request to the request handler 302 of the SCM 210. The request handler 302 requests that the cache manager 304 provide data from the specified location. The cache manager 304 attempts to retrieve data at the specified location in the file from the cache 212.

If the specified location is not yet in the cache 212, the cache manager 304 notifies the request handler 302. The request handler 302 then requests that the data transport interface 306 retrieve content at the specified location. In response, the data transport interface 306 sends a GET request specifying a range of data starting at the specified location, regardless of whether and where the data transport interface 306 was in the midst of downloading the file 226.

For example, if the location specified by the requester is at the end of the file 226, and the data transport interface 306 is in the process of sequentially downloading the file 226 and is at the beginning of the file 226, the data transport interface 306 interrupts its sequential download and sends a range request for data starting at the specified location. After content is retrieved from the specified location the data transport interface 306 resumes its sequential download from where it left off prior to receiving the location-specific request.

The components of the edge server 202, the MAS 204 and the stream cache module of FIG. 3 may be combined or reorganized in any fashion, depending on the particular implementation. For example, the data stores (e.g., content cache 212 and content data base 222) may be separate from their associated servers. The data stores may be any type of memory or storage and may employ any type of content storage method. The data stores, such as content cache 212 and database 222, may include database server software, which enables interaction with the data stores.

Figure 4:
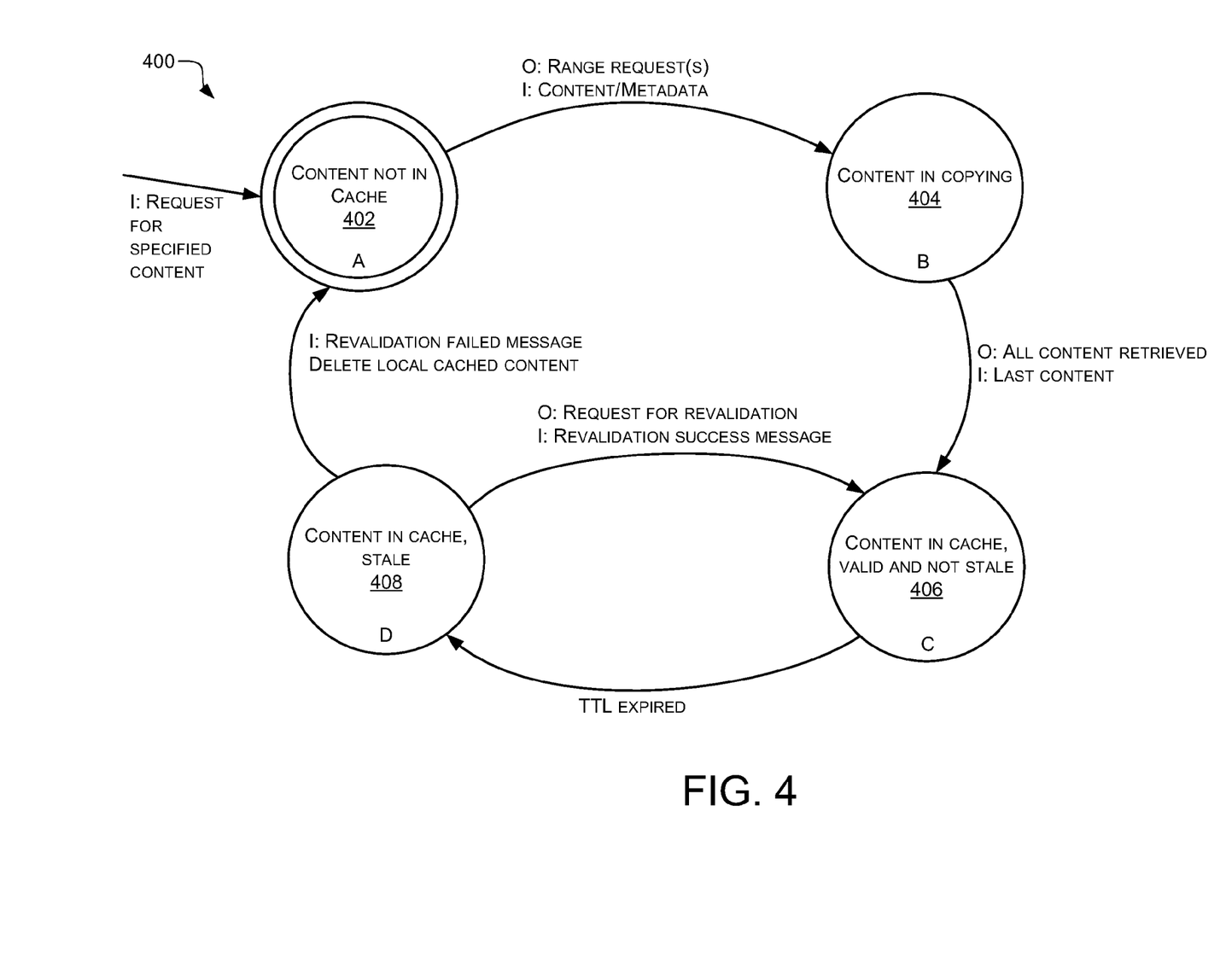
FIG. 4 is a state diagram illustrating one possible set of states that a streaming cache module can enter according to various embodiments.

FIG. 4 is a state diagram 400 illustrating states that a streaming cache module, such as stream caching module 210 (FIG. 2), or similar component, may enter, and conditions that cause entry into and exit from those states. Initially, in this example scenario, the SCM 210 may enter state A 402 when the SCM 210 receives a request for specified content. It will be understood that the SCM 210 may enter another state initially, but for purposes of illustration, it is assumed here that the content specified in the request is not in local cache. In state A 402, the SCM determines that the specified content is not in the local cache. Upon determining that the specified content is not in the local cache, the SCM enters state B 404.

Upon entry into state B 404, the SCM outputs one or more range requests to a media access server and begins receiving content and/or metadata from the media access server (MAS). It is assumed in this case that the MAS has, or can obtain, a non-stale copy of the requested file.

With regard to range requests generated by the SCM 210, each of the one or more range requests specifies a beginning location of data and a range of data to be retrieved. The range request is a type of request supported by a data transport protocol, such as HTTP, and is recognized by the MAS, which includes a data transport server, such as an HTTP or web server. Thus, the MAS is able to read the range request(s) and respond with portions of the requested content identified in the range request(s).

An initial range request may specify a location in the file that includes metadata about the file that enables the streaming media server to promptly begin streaming the requested content. Such metadata can include control data or definitions that are used by the streaming media server to stream the content.

For example, in the case of a Flash™ file, the initial range request may specify the head of the Flash™ file, which gives information about the layout of the file, such as entire file size, frame size, total number of frames, and so on. In the case of Flash™ files, the initial range request, or one of the first range requests typically also specifies an end portion of the file because the end portion includes information used by the streaming media server to begin streaming the content of the file. For example, in some embodiments, the SCM generates a range request for the first two megabytes of a specified Flash™ file and the last one MB of the Flash™ file.

In state B 404, the SCM continues to request and receive content data until the entire file is retrieved. The content may be retrieved in sequential order from beginning to end of the content file, or the content may be retrieved in some other order. Out of sequential order retrieval may occur in response to a location-specific request from a user viewing the content to move to another specified location in the file. For example, the user may advance (or "rewind") to a particular place in the streaming content file through the user's streaming media player.

When the user moves to a particular location in the streaming file, a request is sent to the SCM specifying the particular location in the file to move to. In response, in state B 404, the SCM generates a range request specifying the requested place in the file. The SCM may also notify the streaming media server (e.g., via the media streaming broker 208) when a portion or portions of the content have been stored in local cache, so that the streaming media server can begin streaming those portion(s).

After the requested content file is completely downloaded, the SCM may generate an output indicating the file is downloaded. The SCM then enters state C 406. In state C 406, the SCM waits until the content becomes stale. In state C 406, the SCM checks the age of the content file and compares the age to a specified "time-to-live" (TTL) value, which may be provided in a message from the MAS. When the content file becomes stale, the SCM enters state D 408.

In state D 408, the SCM sends a request to the MAS to revalidate the content file. The MAS may send a message indicating successful revalidation and a new TTL value. If so, the SCM returns to state C 406, where the SCM again waits until the TTL expires. On the other hand, while in state D 408, if the MAS does not revalidate the content, or generates a message indicating a revalidation failure, the SCM returns to state A 402. Before entering state A from state D, the SCM deletes the stale content.

With further regard to the revalidation of content, one embodiment involves the use of HTTP headers. In this embodiment the SCM sends a HEAD request and will expect one of the HTTP headers: Cache-Control or Expires. Those headers provide TTL information. After a given content file is fully downloaded, the SCM checks the TTL of the given content file in response to each incoming request for the file. If the content file ages past the TTL, then the SCM will send another HEAD request to revalidate the content. The response will depend on the media access server. For example, the Apache HTTP Server responds with a "200" response. Upon receipt of the "200" response SCM checks both the modifying time and the file size to make sure the cache content is still valid. As another example, the Microsoft's IIS™ HTTP server responds to a HEAD request with a "200" if the content is modified and stale, or "304" (not modified) if the content is still valid.

Figure 5:
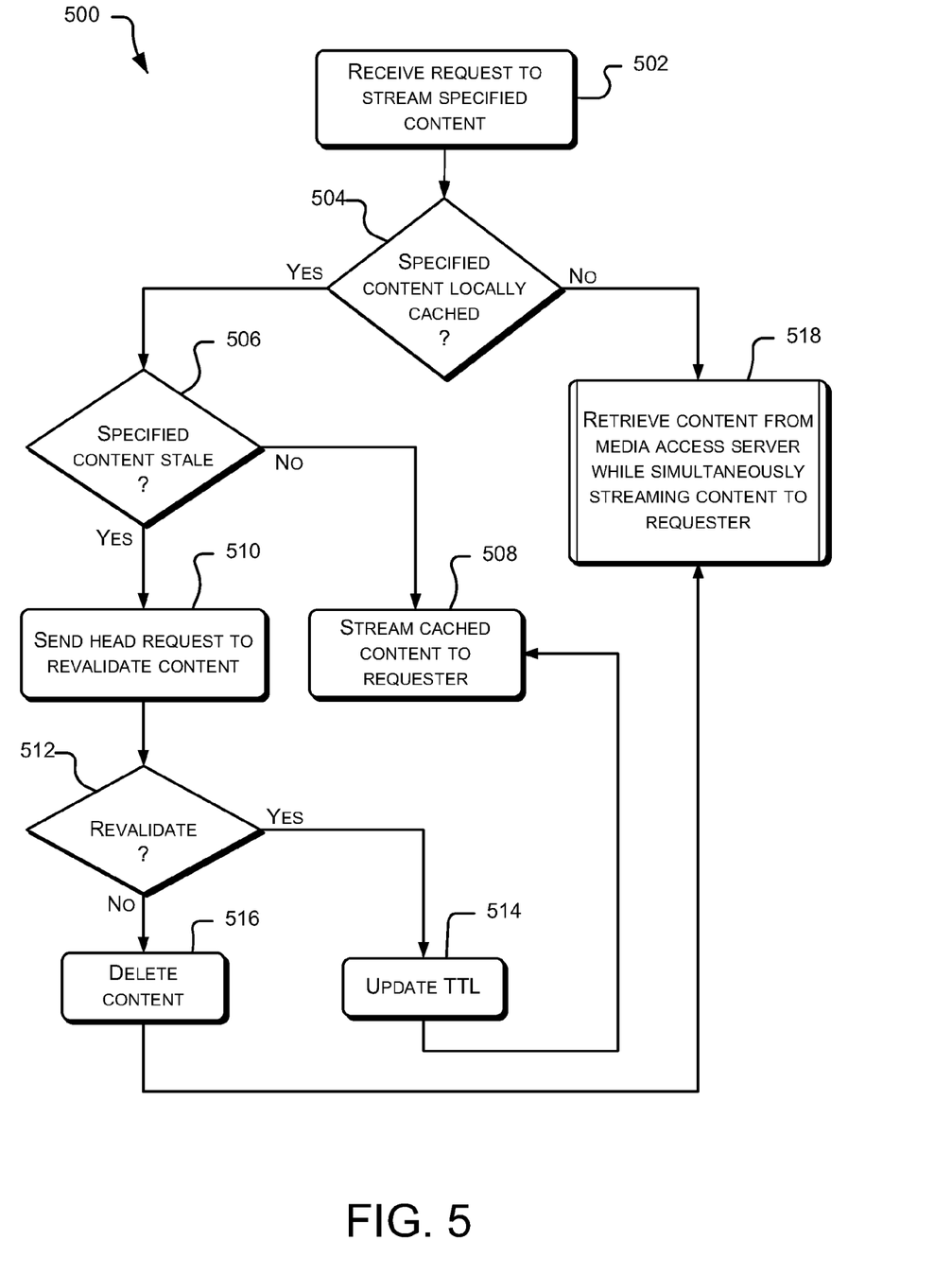
FIGS. 5-7 are flowcharts illustrating example processes for streaming content.
Figure 6:
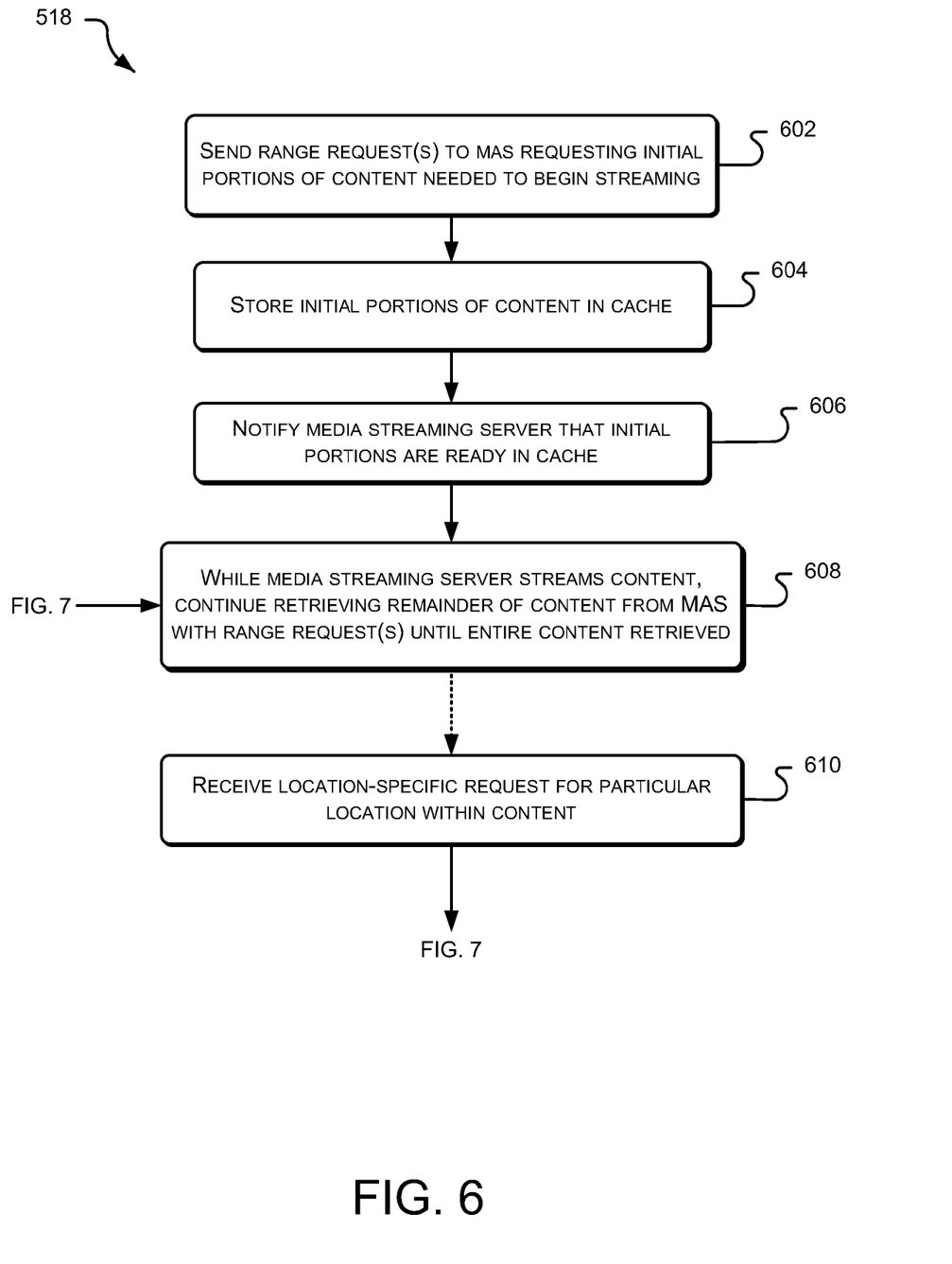
Figure 7:
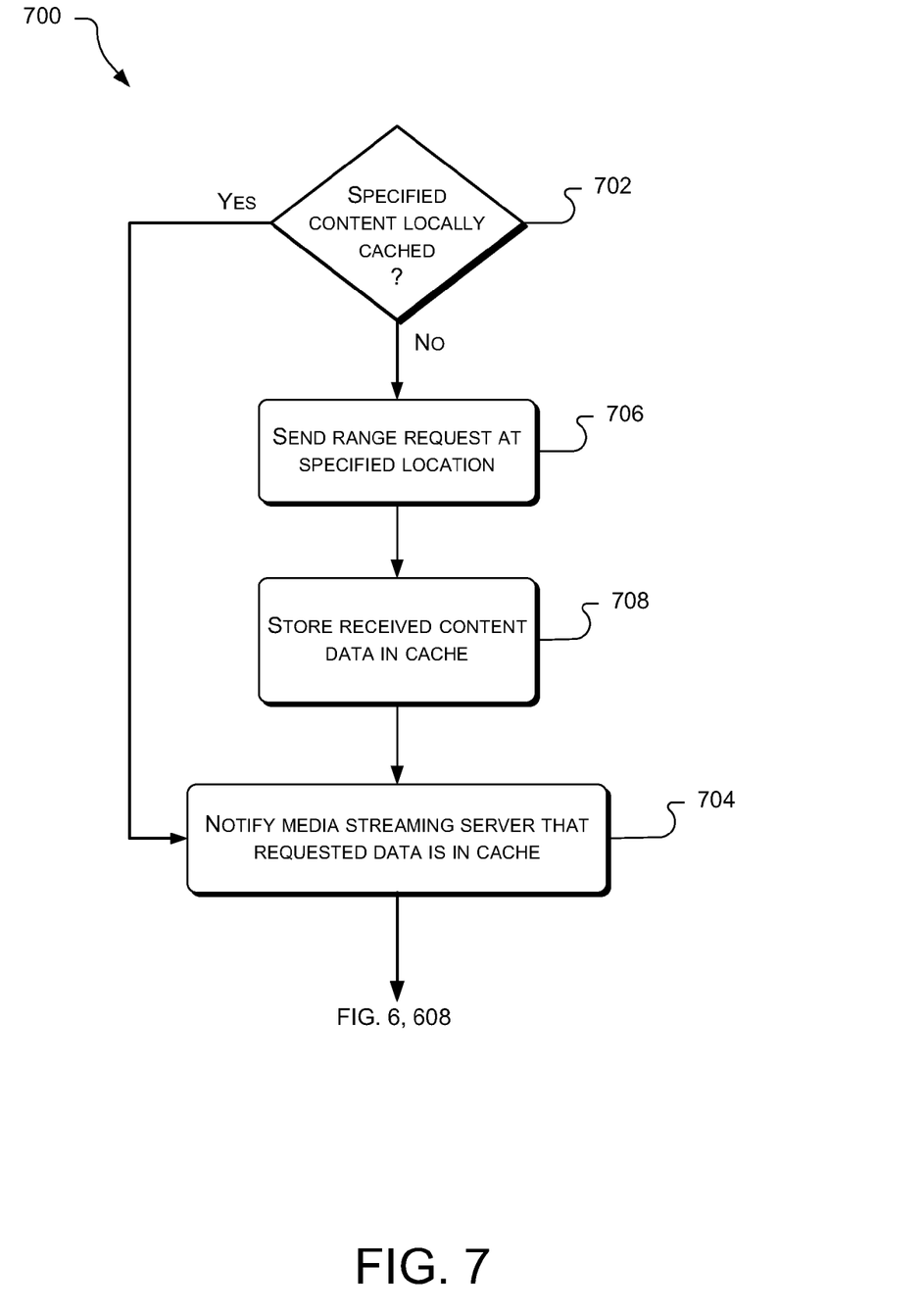

FIGS. 5-7 are flow charts illustrating processes for handling a request to deliver content. In general, the processes include determining whether content in a local cache is available to be streamed and, if so, streaming the requested content to the requester from the local cache; if not, content is revalidated and/or retrieved from a media access server and simultaneously streamed to the requester. The operations need not be performed in the particular order shown. The operations can be performed by functional modules such as one or more of the media streaming server 206, streaming media broker 208 and stream caching module 210 (FIG. 2), or other modules.

Referring specifically now to FIG. 5, in content request handling operation 500, a request is initially received for specified content in receiving operation 502. The requested content is identified in the request. A query operation 504 determines if the requested content exists in local cache. If it is determined that the requested content exists in local cache, another query operation 506 determines if the content in local cache is stale. In one embodiment, query operation 506 compares the age of the locally cached content to a TTL value associated with the content, and if the age is greater than the TTL value, the content is stale; otherwise the content is not stale.

If the locally cached content is determined to be not stale, the operation 506 branches "NO" to streaming operation 508. In streamlining operation 508, the locally cached content is streamed to the requester. On the other hand, if the locally cached content is determined to be stale, the operation 506 branches "YES" to sending operation 510.

In sending operation 510, a HEAD request is sent to a media access server (MAS) to revalidate the locally cached content. In another query operation 512 checks the response from the MAS to determine whether the locally cached content is revalidated. If the content is revalidated, the operation 512 branches "YES" to updating operation 514. Updating operation 514 updates the TTL value associated with the locally cached content, so that the locally cached content is no longer stale. The locally cached content is then streamed in streaming operation 508.

Returning to query operation 512, if the response from the MAS indicates that the locally cached content is not revalidated, the operation 512 branches "NO" to deleting operation 516. Deleting operation 516 deletes the locally cached content. After deleting operation 516, and if, in query operation 504 it is determined that the requested content is not in the local cache, the operation 504 branches to retrieving operation 518. In retrieving operation 518, the requested content is retrieved from the MAS while the content is simultaneously streamed to the requester.

In one embodiment retrieving operation 518 retrieves the content using a data transport protocol (e.g., HTTP) while simultaneously delivering the content using a streaming media protocol. Examples of the retrieving operation 518 are shown in FIGS. 6-7 and described below.

FIG. 6 is a flow chart illustrating a simultaneous retrieval and streaming operation 518. The operations shown in FIGS. 6-7 are typically performed by a stream caching module, such as SCM 210 (FIG. 2), or similar component. The descriptions and scenarios described with respect to FIGS. 6-7 assume that the media access server (MAS) has a non-stale copy of the requested content.

In the case of HTTP, GET requests are sent to the MAS in sending operation 602. The initial one or more GET requests request portion(s) of the content that include metadata describing the layout of the content so that streaming of the content can begin. In one embodiment, for example, when the content to be retrieved in Flash™ media, the first one or two GET requests are range requests for a front portion of the content and an end portion of the content, which contain metadata used to begin streaming.

A storing operation 604 stores the retrieved portions of the content in cache. A notifying operation 606 notifies the streaming media server that the initial portions of the requested content are in cache and ready for streaming. The streaming media server will responsively begin streaming the requested content. Meanwhile, the SCM will continue to retrieve portions of the requested content in retrieving operation 608.

The retrieving operation 608 includes sending one or more additional GET requests for ranges of data in the requested content to the MAS. Content data received from the MAS is stored in cache where the streaming media server can access the content for continued streaming. In one embodiment, retrieving operation 608 retrieves portions of the content sequentially. The portions of content are of a size specified in the range requests. The portion sizes may be set or adapted, depending on various design or real-time parameters. In some embodiments, the portion size is set to 5 MB, but other sizes are possible and likely, depending on the implementation. Retrieving operation 608 continues until the entire content file has been retrieved and stored in cache.

During retrieving operation 608, a location-specific request may be received in receiving operation 610. When a location-specific request is received, the usual order of content retrieval (e.g., sequential) is temporarily interrupted to retrieve content data from the particular location specified in the location-specific request. A particular embodiment of a process of handling a location-specific request is shown in FIG. 7 and described further below.

After handling a location-specific request, the retrieving process 608 resumes. Retrieving operation 608 can continue to retrieve data sequentially after the location specified in the location-specific request, or the retrieving operation 608 could resume retrieval sequentially from where it was when the location-specific request was received.

FIG. 7 is a flow chart illustrating a location-specific requesting handling operation 700, which can be used to respond to a location-specific request when content is being streamed to the requester. As discussed, a location-specific request is a request to provide data at a particular location within content that is currently being streamed. Streaming media protocols are adapted to promptly move to a requested location within a content file.

However, in progressive download protocols, such as progressive download schemes often used with HTTP, moving to a particular place in the content while the content is being downloaded often causes delays because progressive download requires that all data prior to the desired location is downloaded first. Using the scheme shown in FIGS. 6-7 enables streaming of content that would otherwise be delivered via progressive download over a data transport channel, thereby reducing or removing delay associated with a move to a particular location in the content.

Initially, in moving operation 700, a query operation 702 determines whether data at the particular location specified in the location-specific request is stored in local cache. Query operation 702 may utilize a tolerance, whereby it is checked that at least a certain minimum amount of data after the specific location is stored in the local cache. For example, query operation 702 may check that at least 1 MB (or some other amount) of data after the specified location is stored in local cache. By using a tolerance, the moving operation 700 can avoid delays by ensuring that at least a minimum amount of data at the specified location is available for streaming.

If it is determined that at least the minimum amount of data is stored in local cache, the query operation 702 branches "YES" to notifying operation 704. Notifying operation 704 notifies the media streaming server of the location in cache that the requested data is at for delivery. After notifying operation 704, the operation 700 returns to retrieving operation 608 (FIG. 6). As discussed above, retrieving operation 608 may continue retrieving portions of the content after the location specified in the location-specific request, or resume retrieval from the location prior to receiving the location-specific request.

Referring again to query operation 702, if it is determined that the minimum amount of data at the specified location is not stored in cache, the query operation 702 branches "NO" to sending operation 706. Sending operation 706 generates a GET request specifying a range of data after the specified location. The amount of data specified in the range request can be the byte count retrieved in GET requests generated in operation 602 (FIG. 6), or some other byte count. A storing operation 708 receives the requested data and stores the data in the local cache. After storing operation 708, the moving operation 700 branches to notifying operation 704 where the media streaming server is notified of the location of the requested data in cache.

Figure 8:
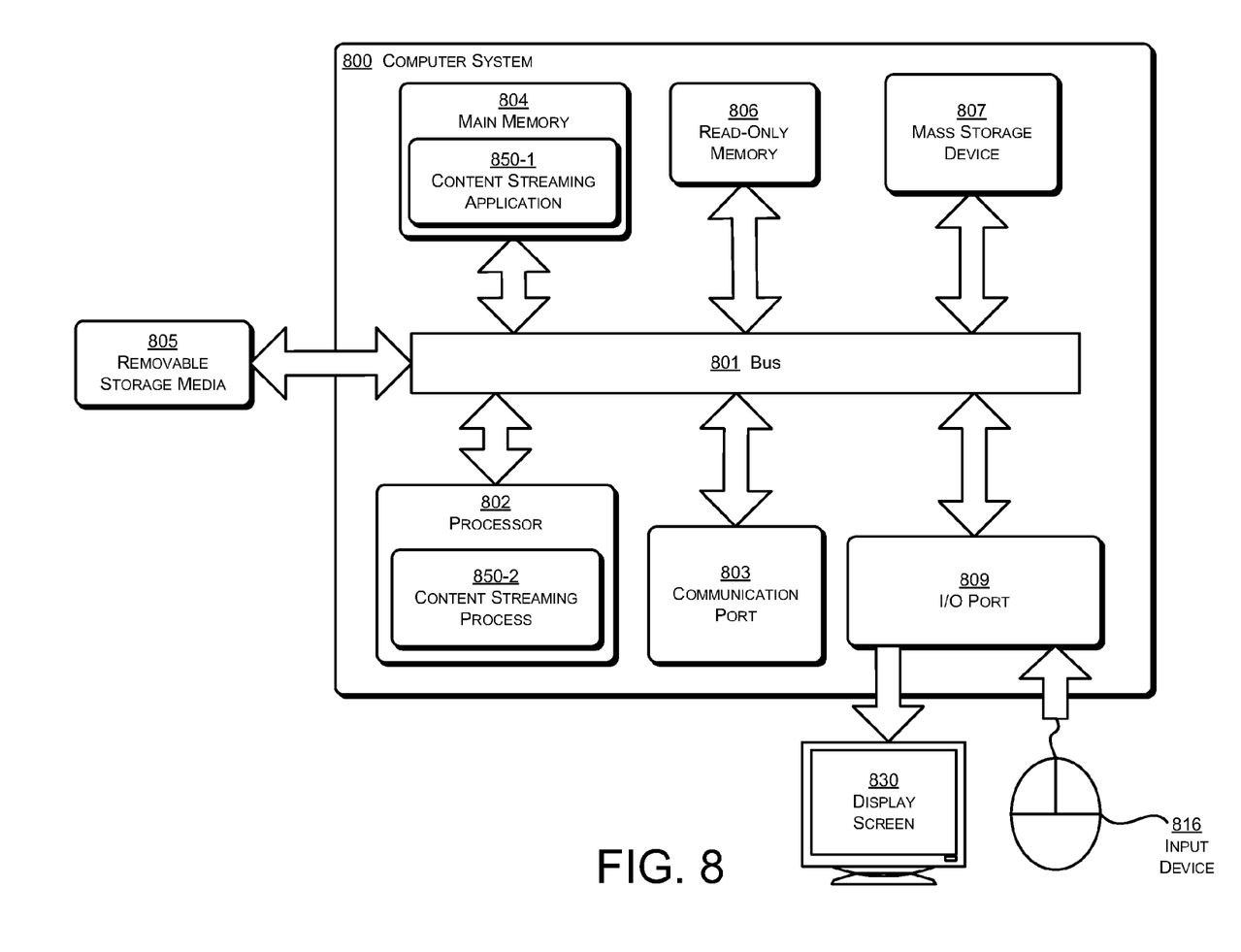
FIG. 8 is an example block diagram of a computer system configured with a content streaming application and process according to embodiments herein.

FIG. 8 is a schematic diagram of a computer system 800 upon which embodiments of the present invention may be implemented and carried out. For example, one or more computing devices 800 may be used to stream requested content to a requester, and, if necessary, simultaneously retrieve the requested content from another source of the content. Computer system 800 generally exemplifies any number of computing devices, including general purpose computers (e.g., desktop, laptop or server computers) or specific purpose computers (e.g., embedded systems).

According to the present example, the computer system 800 includes a bus 801 (i.e., interconnect), at least one processor 802, at least one communications port 803, a main memory 804, a removable storage media 805, a read-only memory 806, and a mass storage 807. Processor(s) 802 can be any known processor, such as, but not limited to, an Intel® Itanium® or Itanium 2® processor(s), AMD® Opteron® or Athlon MP® processor(s), or Motorola® lines of processors. Communications ports 803 can be any of an RS-232 port for use with a modem based dial-up connection, a 10/100 Ethernet port, a Gigabit port using copper or fiber, or a USB port. Communications port(s) 803 may be chosen depending on a network such as a Local Area Network (LAN), a Wide Area Network (WAN), or any network to which the computer system 800 connects. The computer system 800 may be in communication with peripheral devices (e.g., display screen 830, input device 816) via Input/Output (I/O) port 809.

Main memory 804 can be Random Access Memory (RAM), or any other dynamic storage device(s) commonly known in the art. Read-only memory 806 can be any static storage device(s) such as Programmable Read-Only Memory (PROM) chips for storing static information such as instructions for processor 802. Mass storage 807 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 801 communicatively couples processor(s) 802 with the other memory, storage and communications blocks. Bus 801 can be a PCI/PCI-X, SCSI, or Universal Serial Bus (USB) based system bus (or other) depending on the storage devices used. Removable storage media 805 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions, which may be used to program a computer (or other electronic devices) to perform a process. The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 804 is encoded with content streaming application 850-1 that supports functionality as discussed herein. For example, content streaming application 850-1 can include the streaming media broker 208 and the stream caching server 210 of FIG. 2. The media streaming server 206 may be part of the content streaming application 850-1 or a separate application. Content streaming application 850-1 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 802 accesses main memory 804 via the use of bus 801 in order to launch, run, execute, interpret or otherwise perform the logic instructions of the content streaming application 850-1. Execution of content streaming application 850-1 produces processing functionality in content streaming process 850-2. In other words, the content streaming process 850-2 represents one or more portions of the content streaming application 850-1 performing within or upon the processor(s) 802 in the computer system 800.

It should be noted that, in addition to the content streaming process 850-2 that carries out operations as discussed herein, other embodiments herein include the content streaming application 850-1 itself (i.e., the un-executed or non-performing logic instructions and/or data). The content streaming application 850-1 may be stored on a computer readable medium (e.g., a repository) such as a floppy disk, hard disk or in an optical medium. According to other embodiments, the content streaming application 850-1 can also be stored in a memory type system such as in firmware, read only memory (ROM), or, as in this example, as executable code within the main memory 804 (e.g., within Random Access Memory or RAM). For example, content streaming application 850-1 may also be stored in removable storage media 805, read-only memory 806, and/or mass storage device 807.

Example functionality supported by computer system 800 and, more particularly, functionality associated with content streaming application 850-1 and content streaming process 850-2 is discussed above with reference to FIGS. 1-7.

In addition to these embodiments, it should also be noted that other embodiments herein include the execution of the content streaming application 850-1 in processor(s) 802 as the content streaming process 850-2. Thus, those skilled in the art will understand that the computer system 800 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

Various modifications and additions can be made to the example embodiments discussed herein without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed is:

1. A method for delivering content over a network, the method comprising:
    receiving a request for the content from a requester device, the request including a location-specific request specifying a particular location within the content;
    retrieving a first portion of the content from a media access server by generating at least one range request specifying a range of data to be retrieved and a beginning location within the content corresponding to the particular location within the content, wherein the range of data is selected based on a measurement of response speed from the media access server;
    upon receiving the first portion of the content, streaming the first portion of the content to the requester device;
    while streaming the first portion of the content, retrieving the remaining portion of the content from the media access server; and
    storing the entirety of the content in a local memory of an edge server of a content distribution network upon retrieval of the entirety of the content from the media access server for subsequent requests for the content such that the entirety of the content is available at the edge server for additional requests for the content.

2. The method of claim 1, wherein the media access server comprises a server selected from a group comprising an origin server and a content distribution server.

3. The method of claim 1, wherein retrieving the remaining portion of the content comprises requesting the remaining portion of the content from a server that employs progressive download.

4. The method of claim 1, wherein retrieving the first portion of the content comprises retrieving the first portion of the content using a data transport protocol.

5. The method of claim 1, wherein streaming the first portion of the content comprises maintaining a streaming state used by a streaming media server.

6. The method of claim 1, further comprising, prior to retrieving the first portion of the content from the media access server, determining whether the requested content is stored in the local memory and is not stale.

7. The method of claim 1, wherein retrieving the first portion of the content comprises requesting initial data used by a streaming media server to begin streaming the content.

8. The method of claim 7, wherein retrieving the remaining portion of the content comprises requesting an additional portion of the content other than the first portion, and repeating the requesting of an additional portion of content until the entirety of the content is retrieved.

9. The method of claim 8, wherein requesting an additional portion of the content and repeating the requesting comprises requesting sequential portions of the content.

10. The method of claim 9, wherein the method further comprises:
    interrupting the repeating of requesting sequential portions of the content; and
    retrieving data from the media access server at the location specified in the location-specific request if the data at the location has not yet been retrieved.

11. A system for delivering content, the system comprising:
    an edge server of a content distribution network configured to handle a request for a first portion of a specified content, the request including a location-specific request specifying a particular location within the content, wherein the edge server includes:
    a local memory configured to store the entirety of the specified content;
    a media streaming server configured to receive the request and stream the first portion of the specified content to a requester from the local memory; and
    a stream caching server configured to retrieve the remaining portion of the specified content from a media access server by generating at least one range request specifying a range of data to be retrieved and a beginning location within the content corresponding to a location within the content while the media streaming server is streaming at least the first portion of the specified content, wherein the stream caching server is further configured to notify the media streaming server that the entirety of the specified content is stored in the local memory such that the entirety of the specified content is available at the edge server for additional requests for the content, and wherein the stream caching server is further configured to interrupt the retrieval of the remaining portion of the specified content to retrieve data at a particular location specified in the location-specific request.

12. The system of claim 11 wherein the stream caching server is further configured to retrieve metadata associated with the specified content, wherein the metadata is used by the media streaming server to begin streaming the first portion of the specified content when not all content is stored in the local memory.

13. The system of claim 11, wherein the stream caching server is further configured to determine whether the first portion of the specified content stored in memory is stale, and if the content is determined to be stale, send a request to the media access server to revalidate the stale content.

14. The system of claim 11, wherein the stream caching server is further configured to sequentially retrieve ranges of data in the remaining portion of the specified content.

15. The system of claim 14, further comprising a media streaming broker configured to maintain states of the media streaming server.

16. The system of claim 14, wherein the stream caching server is configured to retrieve the remaining portion of the specified content over a data transport channel from a data transport server of the media access server.

17. A computer program product including a non-transitory computer-readable media storing computer-executable instructions, which cause a computer to carry out a process comprising:

receiving a request from a requester for content at an edge server of a content distribution network, the request identifying the content and a first portion of the content associated with a particular location within the content;
determining whether the identified content is stored in a local cache;
if the identified content is stored in the local cache, determining whether the locally stored content is stale;
if the identified content is stored in the local cache and is not stale, notifying a media streaming server that the content is ready for streaming;
if the identified content is stored in the local cache, and is stale, requesting revalidation from a media access server;
if the identified content is not stored in cache, retrieving the first portion of the identified content from the media access server by generating at least one range request specifying a range of data to be retrieved and a beginning location within the identified content corresponding to the particular location within the content;
streaming the first portion of the content to the requester device;
while streaming the first portion of the content, retrieving the remaining portion of the content from the media access server; and
storing the entirety of the content in the local cache of the edge server upon retrieval of the entirety of the identified content from the media access server such that the entirety of the content is available at the edge server for additional requests for the content.

18. The computer program product of claim 17, wherein retrieving the remaining portion of the content further comprises:
sequentially requesting remaining portions of the content; and
interrupting sequential requesting of remaining portions of the content to retrieve data at the particular location specified in the location-specific request.

* * * * *